United States Patent [19]
Braun

[11] Patent Number: 6,151,577
[45] Date of Patent: Nov. 21, 2000

[54] DEVICE FOR PHONOLOGICAL TRAINING

[75] Inventor: Ewa Braun, Träslövsläge, Sweden

[73] Assignee: Ewa Braun, Traslovslage, Sweden

[21] Appl. No.: 09/339,911

[22] Filed: Jun. 25, 1999

Related U.S. Application Data

[63] Continuation of application No. PCT/SE97/02167, Dec. 19, 1997.

[30] Foreign Application Priority Data

Dec. 27, 1996 [SE] Sweden .................................. 9604800

[51] Int. Cl.⁷ ..................................................... G10L 21/06
[52] U.S. Cl. ......................... 704/276; 704/270; 704/278; 704/272
[58] Field of Search ..................................... 704/270, 276, 704/278, 272

[56] References Cited

U.S. PATENT DOCUMENTS

| | | |
|---|---|---|
| 2,533,010 | 12/1950 | Henabery . |
| 4,913,539 | 4/1990 | Lewis . |
| 5,142,657 | 8/1992 | Ezawa et al. . |
| 5,487,671 | 1/1996 | Shpiro et al. ........................ 704/276 X |
| 5,717,828 | 2/1998 | Rothenberg ............................. 704/270 |
| 5,832,441 | 11/1998 | Aaron et al. ............................. 704/276 |

FOREIGN PATENT DOCUMENTS

| | | |
|---|---|---|
| 2198871A | 6/1988 | United Kingdom . |
| 81 01478 | 5/1981 | WIPO . |
| 94 17508 | 8/1994 | WIPO . |

OTHER PUBLICATIONS

Rabiner, L et al., (Fundamentals of speech recognition), Prentice Hall Signal processing series, pp. 11–38, 1993.

*Primary Examiner*—David R. Hudspeth
*Assistant Examiner*—Abul K. Azad
*Attorney, Agent, or Firm*—Birch, Stewart, Kolasch & Birch, LLP

[57] ABSTRACT

The subject invention concerns a system for phonological training a sound reception device (1), an operating device (5) for controlling the system, interpreting and processing devices (2), and presentation device (3).

The presentation device (3) includes a display screen divided into a plurality of windows (11–17) for simultaneous presentation of a graphic reproduction of the desired sound as well as of the sound produced by the user and received by the sound reception device (1), and of an animated reproduction of speech device (1), and of an animated reproduction of speech organs. The system is adapted to reproduce the sound by fields(s) (41, 42, 51, 52), the longitudinal extension of the field(s) in one direction reflecting the time during which the sound is produced and the graphic display content within each field, such as colours, shading or the like, of the fields denoting the place of formation of the sound in the oral cavity.

17 Claims, 6 Drawing Sheets

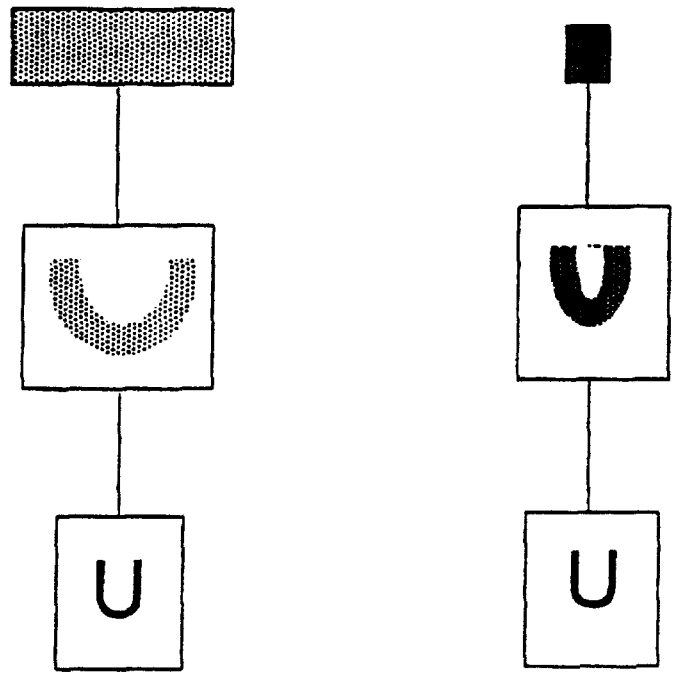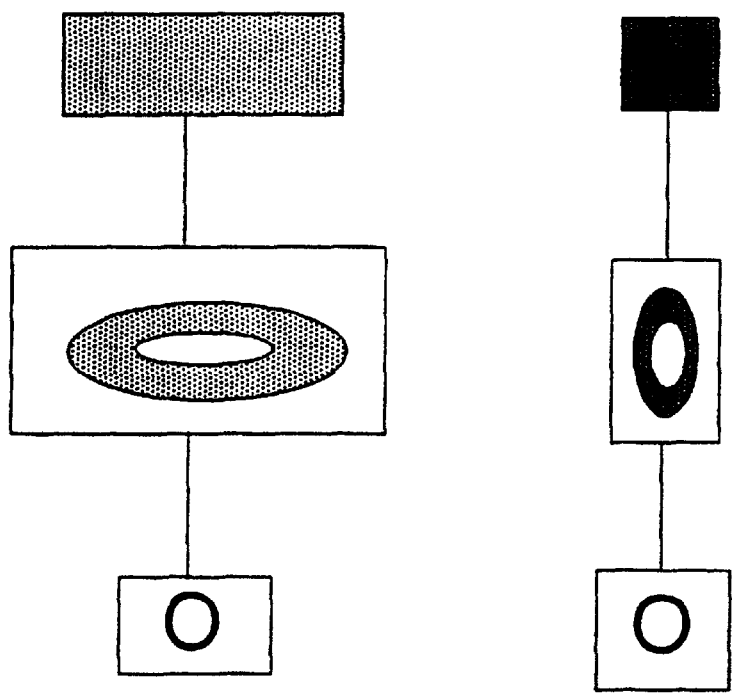
Fig. 6

DEVICE FOR PHONOLOGICAL TRAINING

CROSS REFERENCE TO RELATED APPLICATIONS

This application corresponds to International Application PCT/SF 97/02167 filed Dec. 19, 1997.

TECHNICAL FIELD

The subject invention concerns a device for phono-logical training, comprising sound reception means, operating means for controlling the device, interpreting and processing means, and presentation means, said presentation means comprising a display screen divided into a plurality of windows for simultaneous presentation of a graphic reproduction of the desired sound as well as of the sound produced by the user and received by the sound reception means, and of an animated reproduction of speech organs.

BACKGROUND

The overall problem with which dyslexia patients are faced is to relate sound to the adequate letter. The dyslexic individual who does not automatically achieve developed phonological awareness will lack the fundamental requirements for learning to read and write. He/she will have difficulties in recognising and defining speech sounds. Several studies in this respect support the method involving presentation of the sound by visualisation thereof. In addition, dyslexia is often linked with the possession of creative abilities manifesting themselves for instance in excellent visual perception. The method of creating a link between sound and letter by means of visualisation therefore offers a pedagogical possibility of employing the own resources of the dyslexic individual.

However, the method could also advantageously be used in many other connections, among them for elementary school pupils having a particular need for phonological training, for instance pupils having concentration difficulties. The method is equally useful with respect to individuals who have impaired hearing or are deaf.

Another possible use of the method is for the rehabilitation of individuals in need of rehabilitation following a stroke or an accident to improve their abilities of speech, reading and writing.

Another possible field of use is that of language training, in which field the method may facilitate the learning of new languages.

The invention relates to a device according to which the above method may be practised automatically, allowing the student to use the device essentially on his own for practising purposes.

Such automated speech teaching devices are previously known, e.g. from U.S. Pat. No. 2,533,010. The device described in that publication comprises a sound-recording microphone registering the sound produced by the user. The sound is then presented in graphic forms frequency curves displayed on a screen. Simultaneously, a cross section through the oral cavity and a picture of the lips are display to show how the speech organs preferably should be positioned and moved to produce a word, also displayed on the screen. A curve representing a teacher's standard solution also is displayed, allowing the user to compare the curve produced by him with the standard.

The disadvantages of this solution are, however, that it is comparatively inconvenient to use. It does not allow the user to decide for himself what words or phonemes he wishes to practise. In addition, the link between the curves and the image of the speech organs is difficult to interpret by the user. At best, the user may register the existence of a difference between the curve produced by himself and the teacher-produced one, but he is offered no help as to how to change the sound production in order to improve the sound. On the whole, the prior-art device generally is a poor instructor of how to produce the sound, i.e. where in the oral cavity that the sound is to be generated, and how the formation of the sound should be done. Other disadvantages connected with this prior-art device are that it is large and space-requiring.

Also WO 94/17508 discloses a device comprising a microphone for recording sound, a computer for transforming sound into a curve, and a screen for displaying the curve thus obtained, a curve representing a teacher's solution and the discrepancy between the two curves. This device is smaller and more manageable than the previous one. However, also in this case the user is not informed of how the sound production/formation is to take place or what changes are required in order to reduce any differences that may exist between the user-produced curve and that of the teacher's solution.

The document GB 2 198 871 A, finally, discloses a device similar to those described above, with the difference that it allows the user to decide for himself and to have influence on which phonemes he wishes to practise or how they are to be combined to form various words. This is achieved by the user indicating a letter or a combination of letters by means of an operating means. The above-mentioned drawbacks are, however, found also in this device.

OBJECTS OF THE INVENTION

For the reasons stated the present invention has for its object to provide a device for phonological training, by means of which the user will receive guidance on sound formation and production as well as on how changes are to be made in order to achieve the desired result.

This object is achieved by means of a device in accordance with the appended claims.

BRIEF DESCRIPTION OF THE DRAWINGS

The invention will be described in more detail in the following for exemplifying purposes with the aid of the annexed drawings, wherein:

FIG. 6 is a third example of visualisation of phonemes in accordance with the invention.

DESCRIPTION OF PREFERRED EMBODIMENTS

Figure 1:
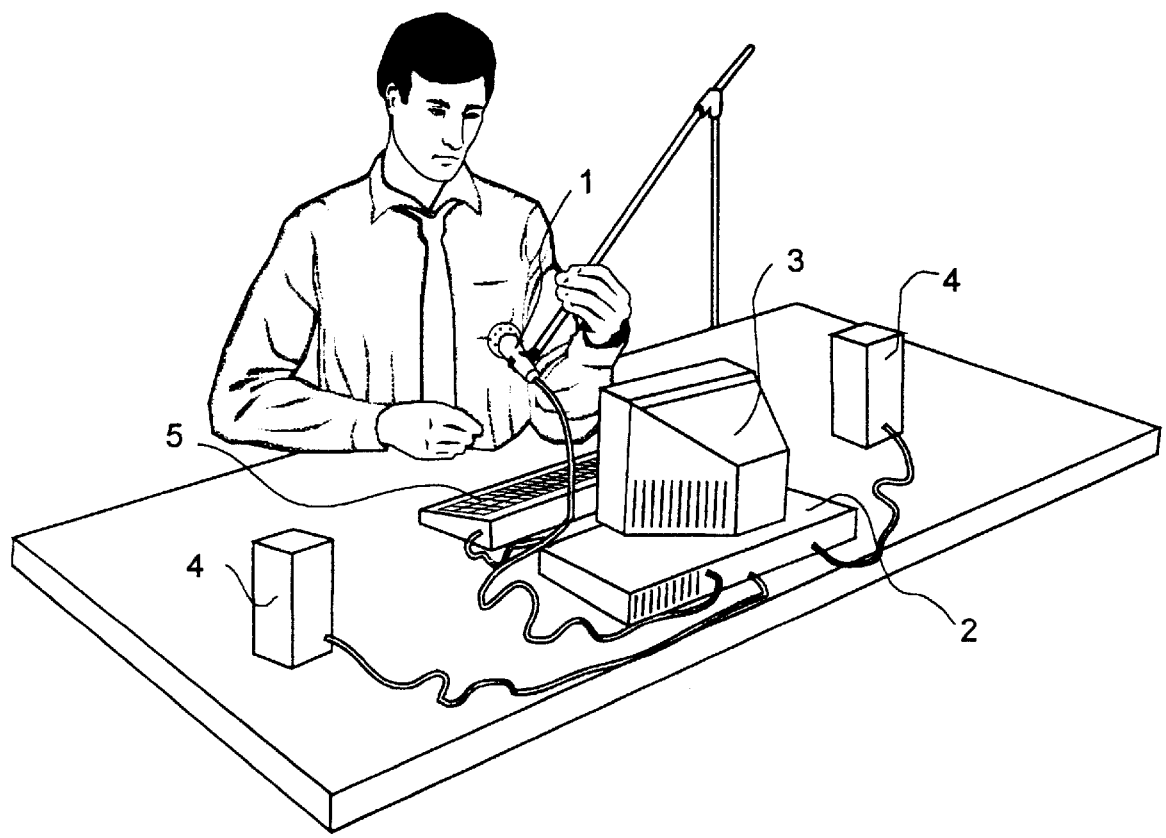
FIG. 1 illustrates a device in accordance with the invention.

FIG. 1 shows schematically a device in accordance with the invention. The device comprises a sound-reception means 1 which may be e.g. a microphone, a processing means 2 which may be e.g. a computer, and a presentation means 3 which may be e.g. a display screen.

Advantageously, the device comprises loud-speakers 4 or the like. The microphone 1 is designed to record the sounds produced by the user. Preferably, the device also comprises operating means 5, such as a keyboard or the like, by means of which the user can control the device.

Figure 2:
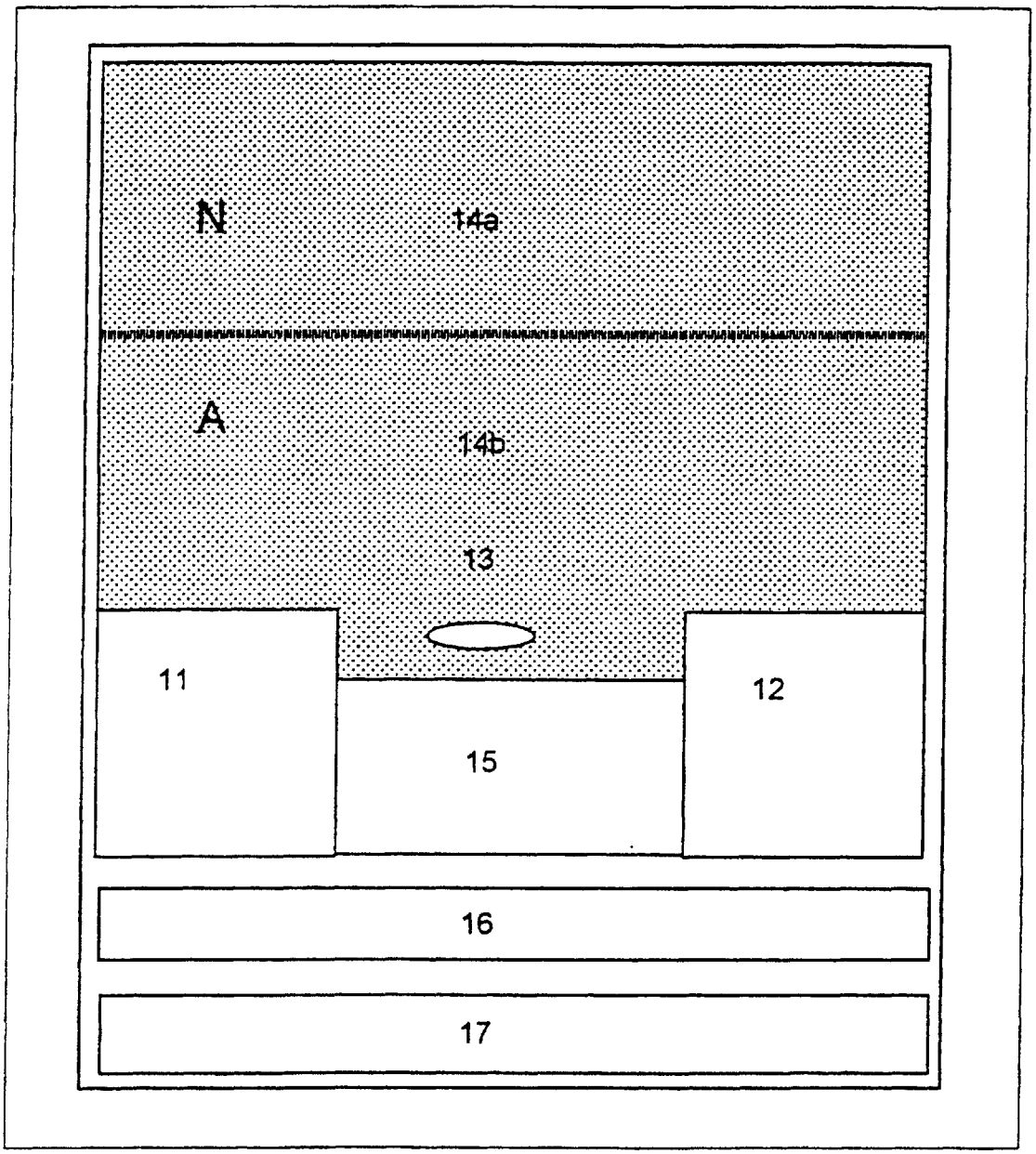
FIG. 2 is a schematic representation of a division of the screen in accordance with the invention.

The display screen 3 is designed to show several different image-presentation windows simultaneously. One example of screen division is shown in FIG. 2. In this case the screen comprises eight different image-presentation windows. In the first window 11 the motor function of the mouth, i.e. how the lips move, when the desired sound is being pronounced correctly, is reproduced in animated form. The second window 12 is a cross-sectional view of the oral cavity, a so called profile of articulation showing the motions and points of abutment of the tongue, the use of different volumes of air in the mouth and the throat and so on, required to produce the correct pronunciation of the desired sound. Window 13 could show for example the manner in which abdominal support is used in the formation of the desired sound, i.e. how the muscles in the abdominal area should be made use of to assist in achieving correct pronunciation. Window 14 is divided into two parts, 14a and 14b. The upper window 14a displays a visual representation of the correct pronunciation of the desired sound, as will be described in closer detail in the following. Window 14b below displays a visual representation of the user-produced sound recorded by the microphone 1 and processed by the computer 2. Because of the juxtaposition of these two windows the user may conveniently discern discrepancies between his own pronunciation and the correct pronunciation. Two windows, 15 and 16, show the desired sound in letter form, one window for instance showing one or a few letters at a time whereas the other window shows longer combinations of letters, such as entire sentences or the like. Advantageously, these windows are connected to the operating means 5, allowing the user to input for instance the desired letter combinations in order to receive assistance from the device to pronounce them. Alternatively, the operating means could instead be a computer mouse or similar means and one of the windows could display the alphabet, thus allowing the user to indicate the desired letters. The last window 17, finally, is an operating panel from which the user may select various functional modes.

For example, the user may choose a listening mode, selecting one sound which is simultaneously displayed in all windows and possibly also could be listened to at the same time. This could be effected either in real time or in slow motion. The user could thereafter pronounce the sound which is visualised and may be compared with the standard. Sound discrepancies, if outside predetermined tolerance values, result in different pieces of advice to the user as to what changes in his pronunciation are desired in order to achieve the correct sound.

Alternatively, the user could instead select a test mode according to which the user produces and registers one sound, one syllable or one word, whereupon this sound is presented to the user together with the standard pronunciation.

The visualisation of the sound could be effected in many different ways, depending among other things on the user's present stage of learning. The basis of the visualisation is to create an image of each phoneme along a time axis, giving the various parts of the sound configuration different space depending on the duration of use. Furthermore, the visualisation could be made by means of a frequency spectrum or the like. The preferred visualisation is that based on where the sound is produced, as will be described further on.

Speech sounds are produced by creating different volumes in the oral cavity and the throat and by means of motions of articulation. The articulation is based on various combinations of movements of the lower jaw, the body of the tongue, the tip of the tongue, the lips and the larynx. Consequently, it is possible to present speech sounds by means of animated lip movements (window 11 above) and a profile of articulation, i.e. an animated cross-section image of the oral cavity (window 12 above).

Figure 3:
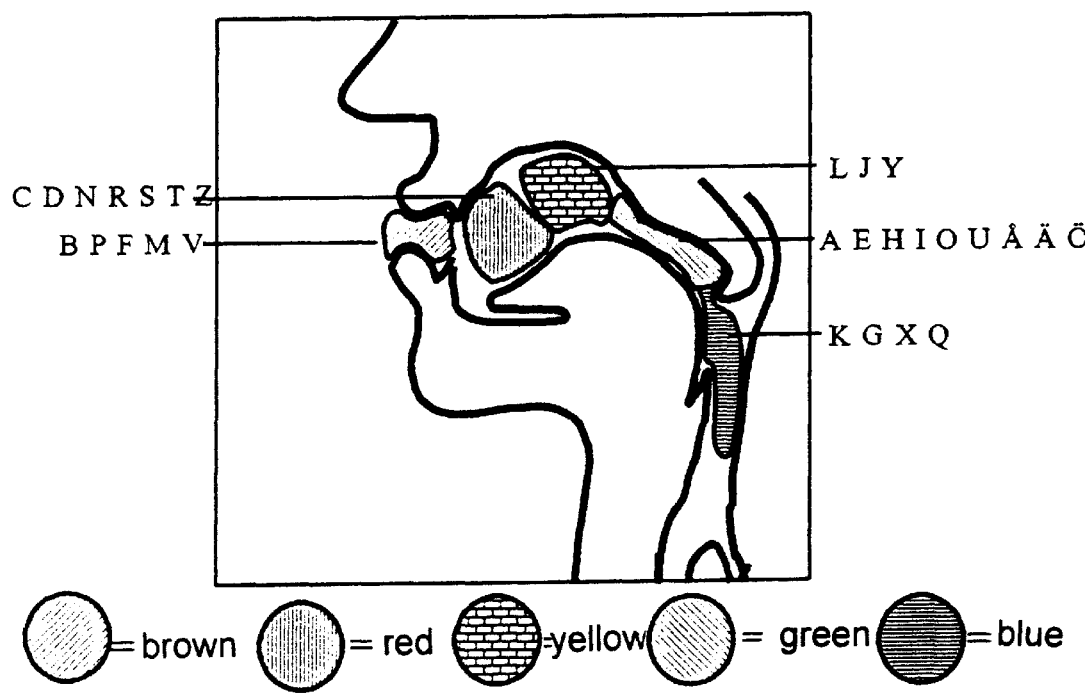
FIG. 3 is an image of a profile of articulation.

FIG. 3 shows a picture of such a profile of articulation. The areas of formation in the oral cavity relating to the various sounds are also indicated. These areas are marked by different colours in the cavity, the colour of the area closest to the lips being reddish brown, the colours gradually changing to red, yellow and green, ending at the throat in blue. For example, the sound "k" is formed in the dark blue area by an attack sound in the rear part of the abutment pipe whereas the sound "b" is formed by the lips being pressed together. Advantageously, short sounds are presented in more intense and saturated colours whereas for example long-vowel sounds are given a less intense and lighter colour tone. It should be mentioned already at this point, however, that the choice of colours could be different without impairing the function of the invention.

Figure 4:
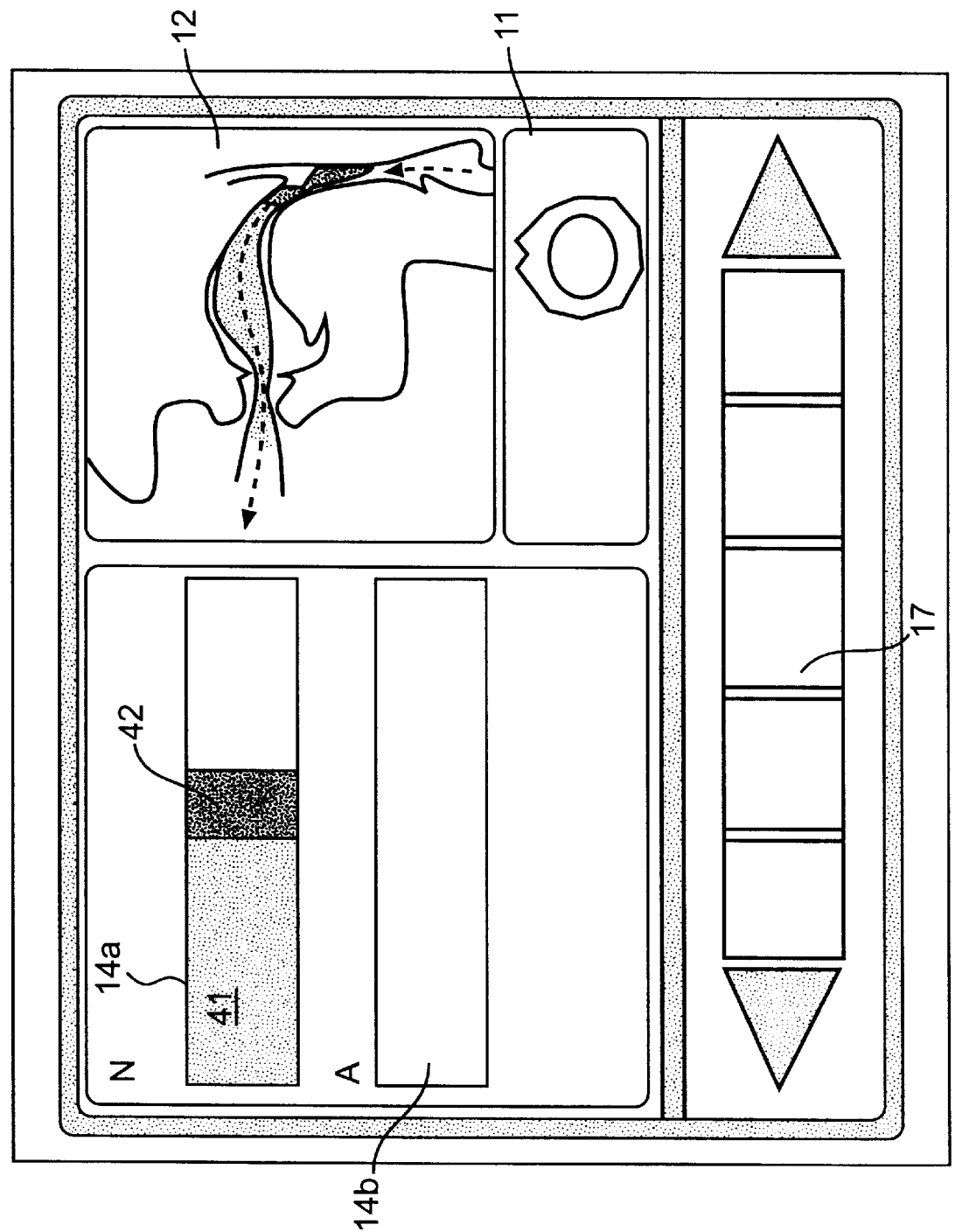
FIG. 4 is a first example of visualisation of phonemes in accordance with the invention.

FIG. 4 illustrates the manner in which the sound-related colouring may be made use of to visualise a sound. Window 11 in FIG. 4 illustrates, like before, the lip movements required to form a desired sound, which in this case is "ak". In an identical manner, the formation of the sound in the articulation profile is shown in window 12. FIG. 14a show differently coloured blocks the extensions of which lengthwise denote the duration of the formation of the respective sound, and the colours of which denote where the sound is formed. These colours correspond to the above-mentioned colour areas of the articulation profile. Consequently, the sound "ak" is visualised in FIG. 4 by a first block 41 having a light green colour, which at the end runs into yellow, thus indicating the formation of a long vowel "a", followed by a second shorter block having a dark blue colour, showing the production of the consonant "k". The darker colour of this latter block shows that this sound is shorter and snappier than the previous, long-vowel sound. Window 14b illustrates with the aid of the same visualisation method the sound produced by the user.

For users that have reached a different ability level it is likewise possible to replace the rectangular blocks by blocks the shape of which as such gives a suggestion of the manner of forming the corresponding letter. This feature is exemplified in FIG. 6 wherein the shift from rectangular blocks to letters is shown with respect to the letters "U" and "O". This drawing figure also indicate the manner in which the longer-sounding vowels, to the left, are denoted by their longer extension and a lighter colour shade whereas the shorter sounds, to the right, are denoted by their shorter extension and a darker and more saturated colour tone.

Figure 5:
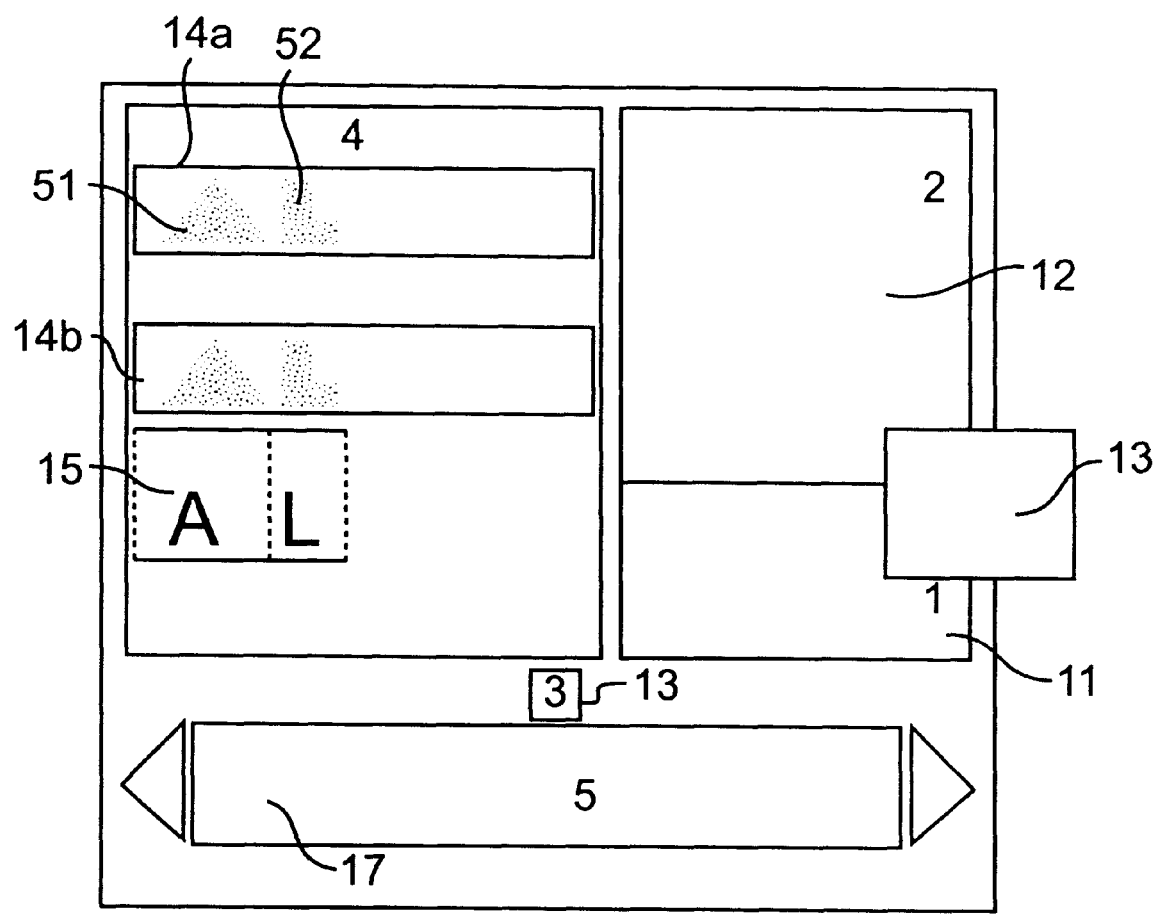
FIG. 5 is a second example of visualisation of phonemes in accordance with the invention.

This feature could likewise be utilised in the manner appearing from FIG. 5 wherein the word "AL" is visualised by means of a first block 51 which is light green, comparatively elongate and of a stylised configuration simulating the letter "A", followed by the second block 52 which is dark yellow, shorter and has the configuration of a stylised "L". An extra window 18 may be used to give a visual presentation of the meaning of the word, in this case a picture of a tree ("al" being Swedish for alder-tree).

In addition, the device may be controlled by the operating means 5 in order to produce the desired speed, the desired sound, the desired level of difficulty of sound combinations, repetition of operations, if desired, and so on. Advantageously, the device is adapted to compare the user-pronounced sound to the standard-pronounced sound and to accept the user-produced sound, should the discrepancies be within predetermined tolerances. When the discrepancies are too large, the device may be arranged to advise the user as to how and where he needs to change his way of sound formation. Such advice could concern for instance the place of formation of the sound, how the sound is articulated while making use of the shaft of air inside the oral cavity, the abdominal support and so on, the duration of the sound formation, etcetera.

The device could also be used in many other ways. For instance, a combination of letters could be indicated, either by the user himself or automatically by the device, whereupon the user may practice pronunciation of the letter combination. Alternatively, the user could instead register sounds in the microphone by speech, sounds which the device interprets and then visually presents the manner in which these sounds are written by means of letters, and possibly also presents a corrected image of the accepted appearance of the sound. A third variety is to display an image of the object.

The device in accordance with the invention thus provides the user with an experience, i.e. a visualisation of the sound, in which process other parts of the brains are activated than those usually employed in the process of reading. In this manner, weakened areas of the brain could be trained.

Several varieties of the embodiment described above are possible. Such varieties may for instance extend to other fields of application, such as language teaching, singing-technique practices, and others. Also other forms of sound visualisation are possible, however all still defining the place of sound formation in the oral cavity, and so on. It is likewise possible to use different shades and nuances of grey, different dot patterns or the like to indicate the various areas of the articulation profile and for the visualisation of the sound. Such varieties must be regarded obvious and to be within the scope of the invention as the latter is defined in the appended claims.

What is claimed is:

1. A device for phonological training, comprising sound reception means, operating means for controlling the device, interpreting and processing means, and presentation means comprising a display screen divided into a plurality of windows for simultaneous presentation of a graphic reproduction of the desired sound as well as of the sound produced by the user and received by the sound reception means, and of an animated reproduction of speech organs, characterized in that the device is adapted to reproduce the sound by means of field(s), the longitudinal extension of said field(s) in one direction reflecting the time during which the sound is produced and graphic display content within each field denoting the place of formation of the sound in an oral cavity of a user.

2. A device as claimed in claim 1, characterised in that by means of the operating means the user may control the device with respect to which sounds to be practised and at what speed such practice is to take place.

3. A device as claimed in claim 1, characterised in that the presentation means also is adapted to show the lip movements during the formation of the desired sound, and also how the abdominal support is to be used, the various windows being mutually synchronised.

4. A device as claimed in claim 1 characterised in that the processing means is adapted to compare the graphic reproduction of the desired sound with the user-produced sound, discrepancies within predetermined tolerance limits being considered acceptable, whereas larger discrepancies generate an error signal to the user.

5. A device as claimed in claim 4, characterised in that the processing means is adapted, in response to discrepancies outside the tolerance limit, to generate advice of correction to the user suggesting suitable changes of his manner of sound formation.

6. A device as claimed in claim 1 wherein said graphic display content within said fields is different colours representative of different sounds.

7. A device as claimed in claim 6, characterized in that the animated reproduction of the speech organs comprise a cross-section of the oral cavity, constituting an articulation profile, the various areas of the oral cavity being shown in said different colours, said colours being representative of the colours of the visualised sound.

8. A device as claimed in claim 6, characterised in that the presentation means also is adapted to show the lip movements during the formation of the desired sound, and also how the abdominal support is to be used, the various windows being mutually synchronised.

9. A device as claimed in claim 6 characterised in that it is arranged to impart to the sound-visualisation fields a configuration that in stylised form describes the letters corresponding to the sound.

10. A device as claimed in claim 6 characterised in that the processing means is adapted to compare the graphic reproduction of the desired sound with the user-produced sound, discrepancies within predetermined tolerance limits being considered acceptable, whereas larger discrepancies generate an error signal to the user.

11. A device as claimed in claim 10, characterised in that the processing means is adapted, in response to discrepancies outside the tolerance limit, to generate advice of correction to the user suggesting suitable changes of his manner of sound formation.

12. A device as claimed in claim 1 wherein said graphic display content within said fields is different shading representative of different sounds.

13. A device as claimed in claim 12 characterised in that it is arranged to impart to the sound-visualisation fields a configuration that in stylised form describes the letters corresponding to the sound.

14. A device as claimed in claim 12 characterised in that the processing means is adapted to compare the graphic reproduction of the desired sound with the user-produced sound, discrepancies within predetermined tolerance limits being considered acceptable, whereas larger discrepancies generate an error signal to the user.

15. A device as claimed in claim 14, characterised in that the processing means is adapted, in response to discrepancies outside the tolerance limit, to generate advice of correction to the user suggesting suitable changes of his manner of sound formation.

16. A device as claimed in claim 12 characterised in that the presentation means also is adapted to show the lip movements during the formation of the desired sound, and also how the abdominal support is to be used, the various windows being mutually synchronised.

17. A device as claimed in claim 16, characterised in that it is arranged to impart to the sound-visualisation fields a configuration that in stylised form describes the letters corresponding to the sound.

* * * * *